W. H. ROE.
CORN HARVESTER.
APPLICATION FILED JULY 1, 1914.

1,222,890.

Patented Apr. 17, 1917.
3 SHEETS—SHEET 1.

Witnesses

William H. Roe
Inventor,
by
Attorneys.

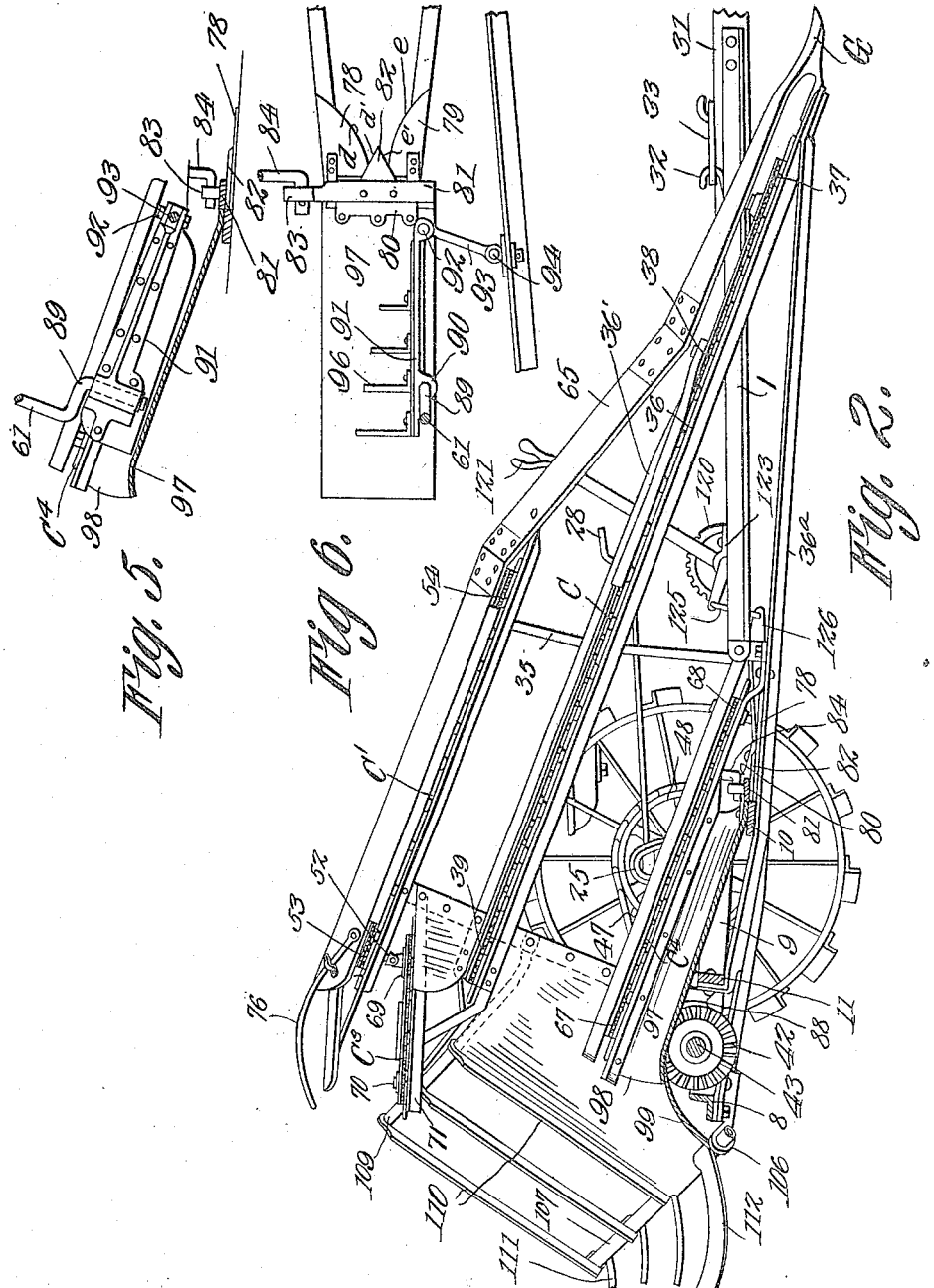

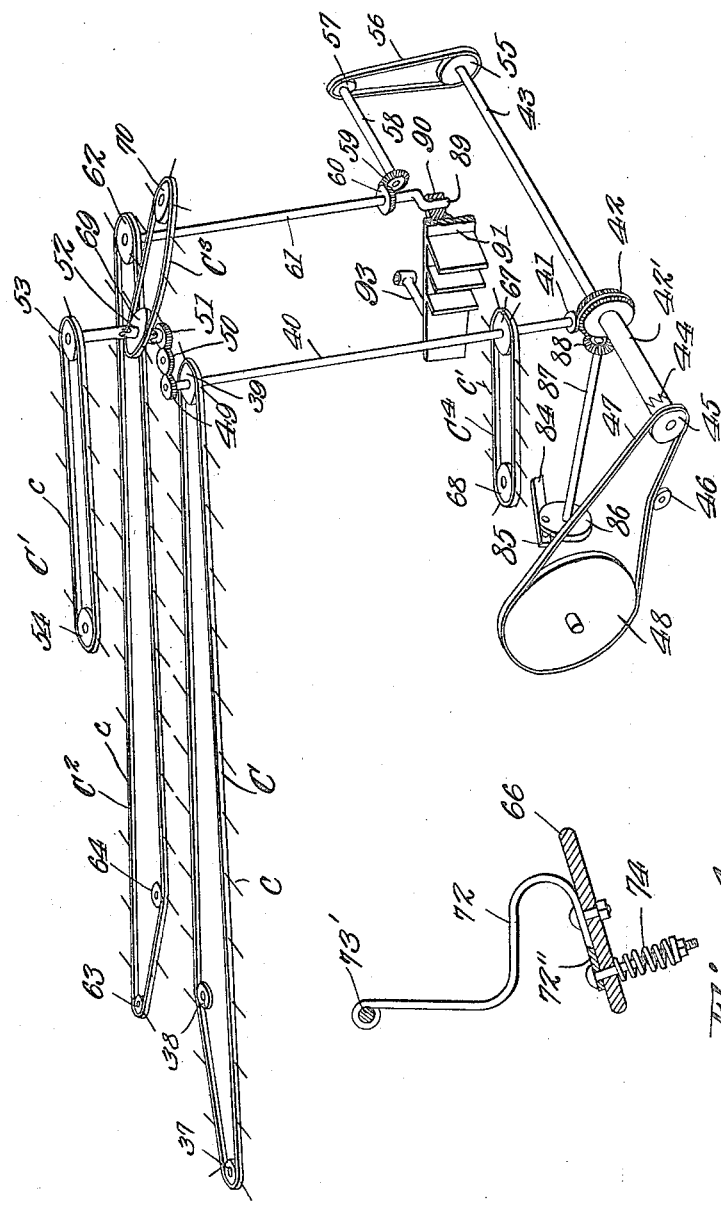

UNITED STATES PATENT OFFICE.

WILLIAM H. ROE, OF GOVANS, MARYLAND.

CORN-HARVESTER.

1,222,890.

Specification of Letters Patent.

Patented Apr. 17, 1917.

Application filed July 1, 1914. Serial No. 848,449.

*To all whom it may concern:*

Be it known that I, WILLIAM H. ROE, a citizen of the United States, residing at Govans, in the county of Baltimore and State of Maryland, have invented a new and useful Corn-Harvester, of which the following is a specification.

This invention relates to corn harvesters and is more especially an improvement upon the structure disclosed in U. S. Patent No. 1,095,030, issued to me on April 28, 1914.

One of the objects of the invention is to provide an improved means for directing the cut stalks away from the cutting mechanism so that the machine will not become choked. In mechanism of this type such as heretofore employed and one form of which has been illustrated in my patent referred to, various objections have been present. For example, where a series of fingers have been extended from a plate slidably mounted on a guide rod, as in the structure disclosed in said patent, the working parts have tended to bind so as to interfere seriously with the operation of the parts. One of the objects of the present invention is to so mount the fingers used for directing the stalks from the cutting mechanism, as to avoid any danger of the parts binding and to insure a smooth running machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Fig. 2 is a longitudinal section taken between the conveyer chains and looking toward the seat side of the machine.

Fig. 3 is a diagrammatic perspective view showing the various conveyer mechanisms and the main drive.

Fig. 4 is a detail view of one of the spring tension stalk guiding arms.

Figs. 5 and 6 are enlarged detail views of the portion of the machine adjacent the stalk cutting and stub feeding mechanism.

Figure 1:
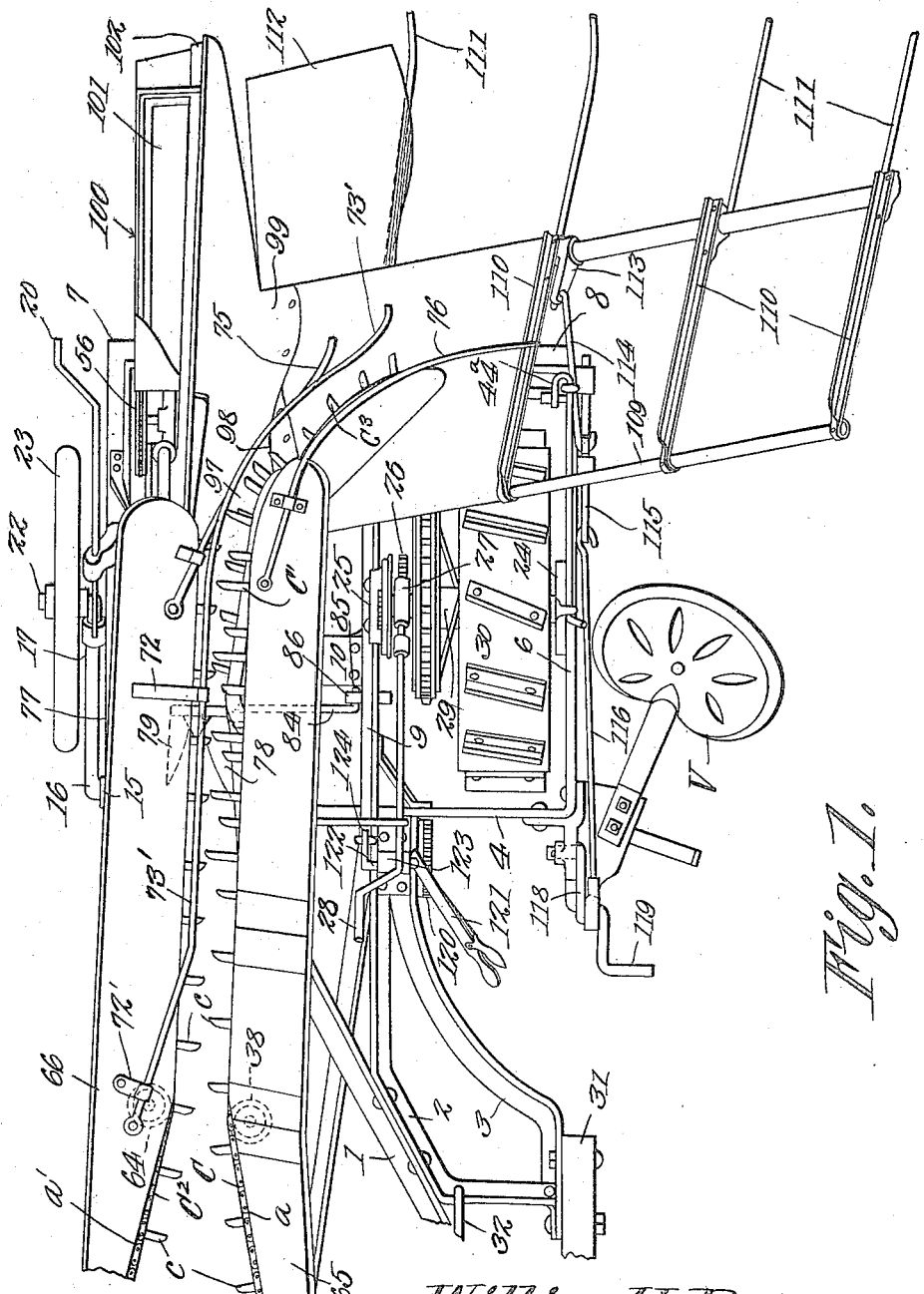
Figure 1 is a top plan view of the main portion of the harvester, the draft connections and guiding ends of the stalk conveyers not being shown.

Referring to the drawings, the numerals 1, 2 and 3 designate the angle irons which constitute a portion of the frame, and as in the above mentioned patent, form a draft attaching means at the forward portion of the frame, while connected to the rear portion of the members 1, 2 and 3 is a rectangular framework composed of the transverse bar 4, the side bars 6 and 7 and the rear transverse bar 8. A cross plate 10 is connected to the outer bar 7 intermediate of the ends of the longitudinal bar 9 and a bar or bracket 11 is supported in connection with the bar 7. Supported upon the upper portion of the bar 7 of the main frame, is a bearing sleeve 15 for the reception of the hooked end of the pivoted rod 16, whose free end 17 as in the patent referred to, carries a rod (not shown) operably connected to be operated by a worm cam (not shown) so as to regulate the height of the free end of the arm 16 and consequently raise or lower the main frame of the machine. The lever 20 actuates the worm cam thus lifting the free end of the arm 16 and the stub shaft 22 which carries the supporting wheel 23.

Carried by the respective bars 6 and 9 of the main frame are the adjustable boxings 24 and 25 which are moved vertically with relation to the wheel frame so as to raise the main frame similarly to the mechanism described for the wheel 23 and by means of the gear 26, the worm 27 and the actuating lever 28. These boxings 24 and 25 carry the short shaft 29 which has mounted thereon, the hub or sleeve of the traction wheel 30, said traction wheel being mounted within the main frame, as clearly shown in Fig. 1, between the bars 6, and 9. A draft tongue has been indicated at 31 and draft equalizing means 32 are provided for carrying draft devices 33.

The stalk feeding mechanism of the present harvester is carried by the main adjustable frame and upon each side is supported in proper position by means of the upstanding rods or plates 35, the respective conveying means C, C' and C² being properly supported thereby, as will hereinafter appear.

In this instance, the angle irons 36 and 36' have journaled therein, the forward adjustable chain tightening and guiding sprocket 37, the guiding sprocket 38, and the drive sprocket 39 upon the upper end of the shaft 40, these sprockets being the main drive and guiding means for the lower stalk conveyer C.

The shaft 40 has keyed upon its lower end, a small bevel pinion 41, which is in mesh at all times with the inner double bevel pinion 42 keyed upon and rotatable with the main drive shaft 43, a sliding clutch member 44 carrying a sprocket 45 being mounted rotatably upon one end of said shaft 43 and in coactive relation with the sleeve 42', so that motion may be transmitted from the traction wheel 30 to the shaft 43 and consequently the shaft 40. The clutch mechanism is shown diagrammatically in Fig. 3 and may be of any desired construction or as particularly set forth in the above mentioned Letters Patent.

In order to properly operate the shaft 43, a sprocket 45 is carried by the clutch member 44, a sprocket chain tightening sprocket 46 being disposed to tighten the sprocket chain 47, which is led over the sprocket wheel 45 to the large sprocket wheel 48 keyed upon and rotatable with the hub or sleeve of the traction wheel 30. By this means, it will be seen that as the corn harvester is drawn, the traction wheel 30 will rotate the sprocket 48 and consequently the clutch member 44 at all times, and when the clutch members 44 and 42' are in engagement, motion will be transmitted to the transverse shaft 43.

Keyed upon and rotatable with the upper end of the shaft 40 is a gear 49 which meshes with an intermediate gear 50 and thereby transmits motion to the gear 51 mounted upon the lower end of the flexible shaft 52, which carries on its upper end the sprocket wheel 53 which coacts with the sprocket 54 to actuate the upper top engaging conveyer chain C', the same being disposed above and in line with the rear end of the conveyer C so as to coact with the same and assist in propelling or moving the standing stalks after the cutting operation to the rear of the harvester. In order to simultaneously operate the stalk conveyer C², which is disposed in parallel relation and coacts with the conveyer C, a sprocket 55 is mounted upon the extreme end of the shaft 43 and has trained thereover a chain 56, which transmits motion to the sprocket wheel 57 and the short transverse shaft 58, this shaft 58 having mounted or keyed upon its inner end, a bevel pinion 59, which is in mesh at all times with the bevel pinion 60 of the vertical shaft 61. This vertical shaft 61 has keyed upon the upper end thereof, a sprocket 62 which coacts with the forward sprocket 64 and the chain tightening or guiding sprocket 63 to properly actuate through the shaft 43 the said conveying chain C², at the same speed and coincidently with the chain C. As before stated, these conveyers are disposed at an incline so as to engage the stalks near the butt ends thereof, and gradually move upward upon the stalk so that the same is engaged intermediate of its ends when delivered to the rear end of the harvester. The casings 65 and 66 incase the respective conveyers which are provided with the small engaging fingers $c$, said casings 65 and 66 being cut away as at $a$ and $a'$ at their forward ends so that the chains of the respective conveyers C and C² will be exposed, as shown, to receive the stalks and assist in uprighting the same until they are passed between the parallel walls of the respective casings 65 and 66, at which time they are placed between the coacting fingers $c$ of the respective conveyers and are properly guided toward the rear of the harvester. This feature is of the utmost importance in that a moving surface is presented at the points $a$ and $a'$ against the standing stalks as the corn harvester is drawn toward the same and therefore no glancing or sliding action is the result. By this means, the stalks are properly gripped by the moving fingers $c$ and the bodies of the chains at this point, the stalks thus being properly guided to the cutting mechanism to be later described.

Keyed upon the shaft 40 near the lower end thereof, is the sprocket 67 of an auxiliary conveyer C⁴ which assists in the conveying of the stub or the butt ends of the stalks to prevent any retardation thereof due to the inclined movement of the conveying means C and C², for as the stalks reach a point adjacent to the forward sprocket 68 of the said conveyer C⁴, the upper ends of the stalks have a tendency to move more rapidly than the butt ends. The sprocket 67 is therefore keyed upon the shaft 40 and coacts with the sprocket 68 to operate the conveyer C⁴, whose prongs $c'$ are disposed in the path to engage the butt ends of the stalks and move the same upon the top surface of the butt guide 97 to be later described.

In order to impart to the upper ends of the stalks a movement to the traction side of the machine, and at the same time cause the same to tilt and fall transversely into the holding fork, the conveyer C³ is provided which passes over the sprocket 69 mounted upon the lower portion of the flexible shaft 52 and a sprocket 70 carried in the frame 71, which is a continuation of one of the casings 65. This conveyer is inclined downwardly, and as before stated toward the traction side of the machine to coact with the various stalk guiding fingers 73', 75 and 76 respectively.

The stalk guiding finger 73' is disposed throughout the length of the casing 66 having its forward end connected and passed through the guide loop 72', while the intermediate portion thereof is mounted within a spring actuated arm or bracket 72 connected to and carried by the upper portion of the casing 66, the detailed construction of which is clearly shown in Fig. 4. The spring 74 is so mounted as to normally hold the short terminal 72'' upon the casing 66 but if any undue strain is placed upon the rod 73', the said spring 74 will permit a slight tilting movement to prevent any breakage and at the same time yieldingly press the upper ends of the stalks into engagement with the fingers of the conveyer C' and in such inclined position as to finally tilt the stalks with the tops outwardly toward the traction side of the harvester. It is to be noted that the arm or bracket 72 is provided with the curved portion as shown in Fig. 4, to permit of the passage therebelow of an ear on the stalk, thus preventing the breaking of the ear from the stalk during the travel of the stalks from the forward to the dumping end of the harvester. It will also be noted that the spring tensioned rod 73' presses the upper end of the stalks toward and into engagement with the conveyer C³.

The stalk cutting mechanism is connected to the rear end of the frame, the stationary blades 78 and 79 being connected to the said respective guide rods and provided with opposed cutting edges $d$ and $e$. Connected to the rear end of the guide arm 77 and above the blade 79 is a casting 80 which forms the receptacle for the sliding end of the bar 81, which has connected thereto, the reciprocatory cutter 82, provided with the cutting edges $d'$ and $e'$ which are disposed to coact respectively with the cutting edges $d$ and $e$ of the stationary blades 78 and 79 respectively. The inner end of the reciprocatory bar 81, carrying the blade 82, is provided with an eye 83 to which is pivotally connected the link or pitman 84 connected by means of the pin 85 to the disk 86 keyed upon and rotatable with the shaft 87, said shaft 87 being provided with a pinion 88 which is in mesh at all times with the outer teeth of the double beveled gear 42. By this construction it will be seen that the rotation of the shaft 43 not only operates the stalk conveying mechanism but also operates the reciprocatory cutter 82 so as to properly cut the stalks as the same are guided to the cutting mechanism of the harvester.

In order to properly assist in the movement of the butt ends of the respective stalks after the same have been acted upon and severed by the mechanism of the harvester, and properly guide the same upon the butt end guiding shelf 97, the crank arm 89 formed at the lower end of the shaft 61 is connected to the sleeve 90 so as to properly oscillate the plate 91, and the forward sleeve 92 is pivotally connected to one end of the link 93. This link 93 is pivotally mounted at 94 to the frame of the machine, so that the rotation of the shaft 61 will impart to the plate 91 and the butt engaging and stepped fingers 96, a movement to project it when moved rearwardly and retract the fingers when moved forwardly. By this means, the butt ends of the stalks are engaged at the forward stroke and carried backwardly over the shelf 97 and released upon the rear and inward movement of the plate 91, the respective flexible joints 90, 92 and 95 in combination with the sliding sleeve 93 permitting such movement. By this means, there is no choking action of the stalks at this point but a continuous feed of the butt ends thereof is the consequence. Furthermore by providing the link connection 93, the proper movement of the fingers 96 can be set up during the rotation of the shaft 61 without danger of the parts binding, as would be the case should a slidable connection be provided for plate 91 instead of an oscillating connection.

In order to prevent the butt ends of the stalks from being moved too far outwardly by the action of the fingers 96, a curved guiding plate 98 is disposed at the end of the butt end guiding shelf 97 in opposition to such fingers 96 and at the beginning of the inclined side of the chute 99, which tends to guide the stub or butt ends of the stalks as the top ends thereof are thrown outwardly and transversely of the machine by means of the conveyer C³ and the guiding fingers 73', 75 and 76, said butt ends of the stalks being guided by said inclined chute 99 into the butt end receptacle 100. This holder is preferably made of a portion of a cylinder with a bottom or end 101, the said bottom 101 being so disposed as to provide a vertical wall to limit the outward movement of the butt ends of the stalks toward the side of the harvester having the wheel 23. The rim of the receptacle 100 is connected to and supported by the rim 102, which is curved and has its lower end connected to the main frame of the machine, while its upper end is connected to the underside of the main frame carrying the conveyer C², thus retaining the receptacle 100 in the proper position with relation to the other mechanism.

The stalk carrier is disposed to coöperate with the stub or butt end receptacle 100, the arms 106 being disposed to the rear of the main frame of the harvester and having journaled therein, the tubular shaft 107, said shaft having disposed thereabove the curved guiding arm 109 and the other depending arms 110, these means forming a fork whereby the tops of the stalks are properly guided to the stalk receiving fingers 111. By this means the shaft 107 can be rotated or oscillated to move the stalk holding fingers 111 and butt end guiding shield 112 from stalk receiving position to the depositing position as clearly shown in Fig. 2.

As set forth in the above mentioned patent, the fork falls by gravity and is returned manually and locked during the reception of a new bundle of stalks. In order that the fingers 111 and the shield 112 may be held in stalk receiving position, the lever 113 is connected by a link 114 to a rod 115 slidably mounted and which is attached by a rod 116 to a lever 118. This lever is controlled by a foot treadle 119 which can be reached readily by the occupant of the seat V.

In order to adjust the forward ends of the casings 65 and 66 and thereby position the same to pick up fallen stalks or present the stalks in the proper position to the cutting mechanism, the segment 120 is disposed to control and lock the actuating lever 121, the same being mounted in ready access to the operator. A controlling shaft 122 mounted in the casting 123 is carried upon the upper face of the frame 2. The lever or arm 124 carried by the shaft 122 has its free end connected by a link 125 to an arm or lever 126, which itself is connected to the forward bar 4 of the main frame so as to tilt the forward end of the casings 65 and 66 to bring the stalk guiding ends G into the proper relative position to the growing stalks.

What is claimed is:

In a corn harvester, the combination with coöperating cutting elements and an inclined shelf extending upwardly and rearwardly therefrom, and a structure fixed relative to the shelf and arranged adjacent thereto, of a plate movably mounted above the shelf and back of the cutting elements, said plate having substantially vertical faces, a reinforcing member extending longitudinally along one face of and secured to the plate and having a sleeve at one end, relatively broad wings or fingers extending laterally from the other face of the plate, said fingers being formed of separate parts secured to the plate, a link connection between one end portion of the reinforcing member and the adjacent fixed structure, and a revoluble crank engaging the sleeve at the other end of said reinforcing member, said crank and link coöperating to impart a combined reciprocating and oscillating movement to the plate and fingers.

In testimony that I claim the foregoing as my own, I have hereto affixed my signature in the presence of two witnesses.

WM. H. ROE.

Witnesses:
 EDWIN C. SOKEL,
 HARRY E. POHLMANN.

Copies of this patent may be obtained for five cents each, by addressing the "Commissioner of Patents, Washington, D. C."